Aug. 7, 1945.  J. AHIER ET AL  2,380,929
INDICATING SYSTEMS PARTICULARLY FOR THE MEASURE OF ANGLES
Filed April 24, 1942  2 Sheets-Sheet 1
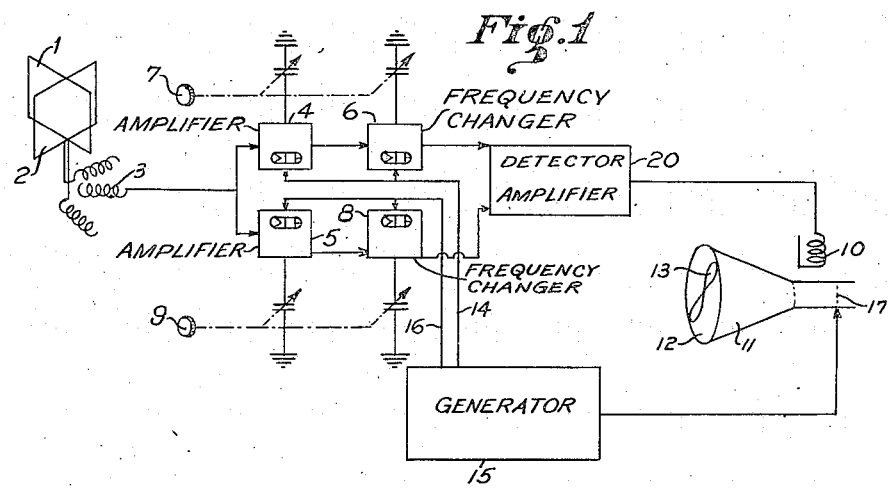
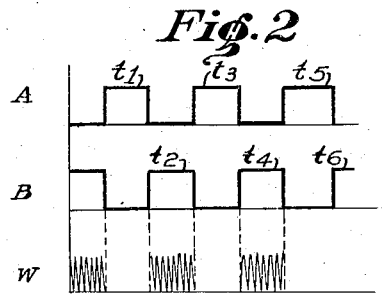
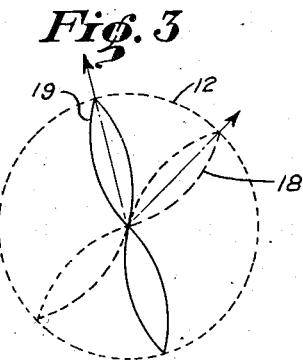
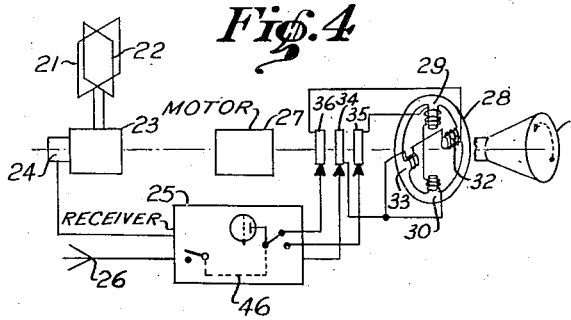
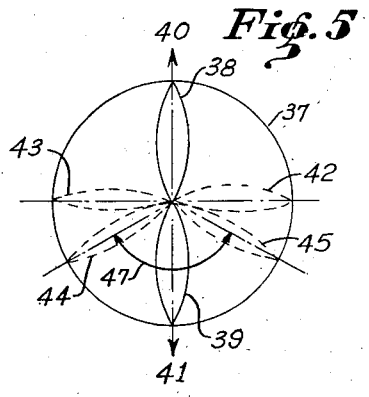
Inventors:
JEAN AHIER
RENÉ HARDY
By *Attorney.*

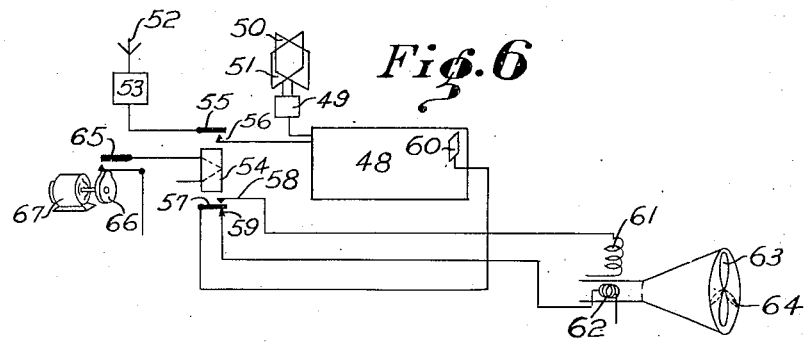
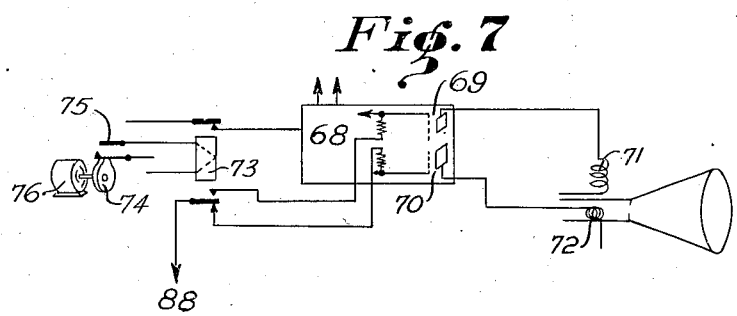
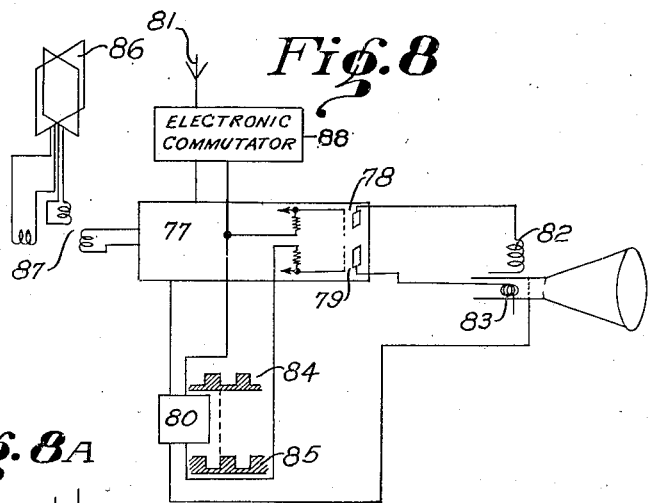
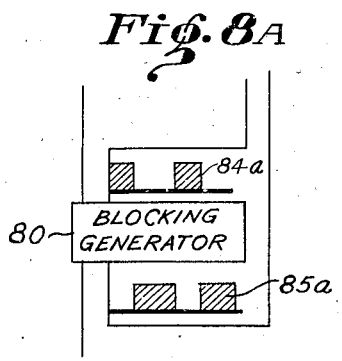
Inventors:
JEAN AHIER
RENÉ HARDY
By [signature]
Attorney.

Patented Aug. 7, 1945

2,380,929

UNITED STATES PATENT OFFICE 2,380,929

INDICATING SYSTEM PARTICULARLY FOR THE MEASURE OF ANGLES

Jean Ahier and René Hardy, Lyon, France; vested in the Alien Property Custodian

Application April 24, 1942, Serial No. 440,416
In France May 17, 1941

16 Claims. (Cl. 250—11)

The present invention relates to indicating systems, particularly for the measurement of angles, and it is specially applicable to radio direction finders, phase meters, and remote repeaters of angles.

In systems of this kind it is frequently of interest to be able to obtain at least two simultaneous indications on the same indicating instrument. In direct reading radio direction finders, for example, it may be desirable to have an indication of the main direction and a second indication that makes it possible to fix the point by recrossing of the two directions, or else to get simultaneously an indication of direction that inherently has a 180° uncertainty as to its lay and also an indication that defines the lay of the indication of direction. In the case of phasemeters or remote repeaters of angles, it may likewise be desirable to simultaneously show on a single indicator a fixed indication as a guide mark and a variable indication that gives the desired measurement, thus giving the guide mark indication an automatically adjustable position.

One of the objects of the invention is consequently the providing of means for causing the appearance of two or more simultaneous indications on the screen of an indicating instrument, e. g. a cathode ray tube.

Another object of the invention is the providing of means for visual differentiation of the various simultaneous indications thus obtained.

According to certain features of the invention, systems of this kind are provided with mechanical, semi-electronic or electronic means for switching the desired indications on to the screen of the cathode ray oscillograph at such a cadence that the two indications will appear permanently on the said screen, these means being disposed so as to effect simultaneously the various commutation operations that are necessary for producing the desired indications on the screen.

According to other features of the invention, these switching means are specially arranged for alternate blocking by means of the grid bias of vacuum tubes that form part of the receiving circuit, while at the same time switching the connections from the doubt eliminating circuit to the receiving circuit, if necessary.

According to other features of the invention, one of the simultaneous indications obtained in this way is differentiated from the others by being made to appear in dotted lines on the screen of the oscillograph, this effect being produced by the application of an additional control voltage that has a frequency higher than the scanning voltage to suitable electrodes of the cathode ray tube so as to extinguish and to illuminate the spot of the cathode ray tube at this high frequency during the corresponding period of the scanning in which this image is formed.

In one example of an embodiment of a radio direction finding circuit that employs features of the invention, two distinct transmission channels are provided in the receiver and these two channels are alternately blocked by means of two series of complementary impulses furnished by a generator of electric impulses of any known kind. The channels thus alternately control the scanning of the cathode ray tube that is used as indicator in such a way as to cause the appearance on the screen of two different images that appear simultaneous to the observer. These two images may represent either two indications of direction of different transmitting stations or one indication of direction and one doubt eliminating indication of a single station. In both cases, the auxiliary image is made to appear in dotted lines by applying to one of the cathode ray tube's electrodes, e. g. the control grid, a higher frequency voltage tapped from the impulse generating circuit or obtained in any other synchronized manner in such a way as to be applied to the said control electrode only during the operating periods of one of the channels.

In other examples of application of the invention to radio direction finding circuits, use is made of electromechanical relay arrangements that are periodically controlled by carrying out the necessary commutations of the scanning.

These features as well as others will be explained in detail in the following description given with reference to the appended drawings, in which:

Fig. 1 illustrates schematically one example of a radio direction finding circuit that makes it possible to obtain two simultaneous indications of direction on the same oscillograph screen;

Fig. 2 is a diagram used in the explanation of the operation of the circuit of Fig. 1;

Fig. 3 illustrates the indications that appear on the screen of the indicating cathode ray tube of Fig. 1;

Fig. 4 illustrates one example of a radio direction finding circuit that is provided with a doubt eliminating system;

Fig. 5 shows the indication that appear on the screen of the indicating cathode ray tube of Fig. 4, and Figs. 6, 7, and 8 illustrate schematically examples of radio direction finding circuits that permit simultaneous showing of both the indications of direction and the indications of lay on the screen of the cathode ray tube that is used as indicator.

Referring to Fig. 1, the circuit illustrated makes it possible to produce indications of two directions on the same cathode ray tube. Reference numbers 1 and 2 designate two perpendicular stators connected to stationary aerials or an assembly of directional aerials. The directional finder 3 is connected to two high frequency amplifier tubes 4 and 5. Tube 6 may, for example, consist of a frequency changing tube that is disposed so as to cooperate with tube 4, the assembly 4, 6 being under sole control of the variable capacity, as indicated by the knob 7. Tube 8 is a frequency changing tube similar to tube 6, and the assembly 5, 8 is tuned by variable capacity by means of the sole control 9; tubes 6 and 8, after having effected the change of frequency, feed the amplifier 20 whose output circuit is connected to scanning circuit 10 which, for example, consists of a coil that rotates around the cathode ray tube 11 employed as indicator.

In this circuit, the two assemblies 4, 6 and 5, 8 are arranged so as to operate alternately. Assuming that the assembly 4, 6 is connected in and that the tubes and also amplifier 20 operate normally, a conventional radio directional image 13 is then obtained on screen 12 of cathode ray tube 11. Radio direction finder 3 and the circular scanning coil 10 rotate in synchronism, and the radial modulation is effected in coil 10 by the variation in shape of the detected and amplified current that proceeds from amplifier 20.

By coupling the grid connection returns of the assembly 4, 6 over line 14 to an intermittent blocking potential generator 15 of any suitable design, operation of the receiver 20 may be periodically interrupted. Fig. 2, for example, accordingly shows at A rectangular shaped currents having positive portions t1, t3, t5. This current may be applied to the grids of tubes 4 and 6, in such a way that these tubes only transmit current during the existence of rectangular potential peaks t1, t3, t5. The image 13 will only appear on screen 12 of the cathode ray tube during the times t1, t3, t5. The duration of the peaks t1, t3, t5 may be selected in such a way as to have at least one complete image 13 on screen 12 during each peak, or at least for image 13 to appear a sufficient number of times per second to insure its luminous persistence. This cadence of repetition must in practice be at least 15 complete images per second. This condition is consequently more than complied with by scannings at the usual speed of about 50 images per second.

If now the grid returns of assembly 5, 8 are controlled over line 16 by the peak generator 15 but with a rectangular current that is complementary to current A, e. g. the one shown at B in Fig. 2, the assembly 5, 8 will be put into operation during the resting intervals of assembly 4, 6. A second image will be obtained on the cathode ray tube if the condensers of tubes 5 and 8 are adjusted to one transmission by control 9 while the condensers of tubes 4 and 6 are adjusted to another transmission by control 7. Each of the images thus obtained will give the direction of a station.

It must be noted that it is not indispensable for the rectangular currents generated by generator 15 to be strictly complementary, neither is it necessary for them to be strictly rectangular. It is sufficient that the operation of assemblies 4, 6 and 5, 8 be alternating.

In order to make it easier to understand the obtained indications and to distinguish the main images from a secondary image, another feature of the invention provides for modulation of grid 17 of cathode ray tube 11 in such a way as to cause one of the images, e. g. image 18 of Fig. 3, to appear as a dotted line while the main image 19 appears as a continuous line. In order to effect this modulation, use is made of the portions t2, t4, t6 of curve B of Fig. 2 to control the transmission to grid 17 of voltage peaks of much higher frequency, e. g. of the order of 10,000 cycles per second, as shown at W in Fig. 2. At each voltage peak, grid 17 of the cathode ray tube 11 becomes strongly negative and this represents an extinction or at least a very considerable diminution of the luminosity of the spot. There is thus produced a curve that appears as a dotted line on the screen.

In the described embodiment, it is possible to leave tubes 4 and 5 permanently connected and only act on the operation of the frequency changing tubes 6 and 8. It will be understood that various other methods may be used for alternately utilizing the tube assemblies 4, 6 and 5, 8.

For direct reading radio direction finders that are especially adapted for the observation of signals of very short duration (e. g. of the order of one second), use is generally made of a radio direction finding circuit of the kind shown in Fig. 4.

Radio direction finding receiver 25 has its input circuits fed by the rotor 24 of radio direction finder 23 which is itself connected to the two perpendicular frame aerials 21 and 22. Instead of these circuits, use may be made of any other directional diagram device usually employed in radio direction finding.

The radio direction finder 23 shown in Fig. 4 is driven, for example, by a motor 27 which itself drives a magnetic coil system 28 that rotates around the cathode ray tube 31 that serves as indicator. The magnetic deflection device 28 that rotates around the tube consists of a pair of deflection coils 29 and 30 and another pair of deflection coils 32 and 33 at right angles to the same. A common point of the two pairs of deflection coils is connected by ring 34 to the high voltage of receiver 25. The input terminals of the two orthogonal magnetic circuits are connected to the two other rings 35 and 36 of the commutator.

When receiver 25 is placed by key 46 in the bearing taking position, i. e. when its input circuit is directly connected to the rotor of the finder and its output circuit to ring 36, as is the case in Fig. 4, and when the finder-motor deflection system rotates continuously, there is obtained a conventional radio directional image 38, 39 (Fig. 5) which makes it possible to know within 180° the direction of the transmission to which receiver 25 is adjusted.

Depression of the doubt eliminating key of the circuit of Fig. 4 to the doubt eliminating position causes the introduction into the receiver of a high frequency voltage proceeding from the antenna; this voltage is suitably superposed in amplitude and in phase on that of the finder to deflect toward each other the arms of the doubt eliminating image, which are then no longer at 180°. Furthermore, this operation switches the output of the receiver to ring 35 of the commutator and thus feeds a deflection system perpendicular to the preceding one. If no high frequency voltage were to come from the antenna, the effect this new position would have on the deflection of the spot would be to produce an image identical to the previous one but shifted by 90° and occupying the position 42, 43, but the fact of adding an antenna current that brings the reception minima closer together by pairs produces images 44, 45 having an angle 47 that depends on the size of the antenna current. The bending takes place either around the branch 39 or around the branch 38 of the directional image according to the phase of the antenna current, i. e. according to the actual lay of the direction of the transmitter. When the bending is effected in the manner shown in Fig. 5, the real direction of the transmission is conventionally taken to be 40 instead of 41.

When the transmission that is being located consists of very brief signals, the operator's physiological reactions are usually not sufficiently rapid to manipulate the key and to cause the bent image to appear within the time the received signal lasts. It is then necessary to provide means for causing the simultaneous appearance of the conventional radio directional image and of a second image that makes is possible to determine the lay of the obtained indication of direction. According to certain features of the invention, this simultaneous appearance of the two images is obtained by replacing the doubt eliminating manual key 46 by a mechanical, electronic or semi-electronic device that automatically effects the alternate commutation of the two positions at a frequency that is sufficient to permit simultaneous observation of both the bearing and doubt elimination images.

Various forms of embodiments that can accomplish this result are shown in Figs. 6, 7 and 8. In the circuit of Fig. 6, radio direction finding receiver 48 is connected by means of a finder 49 to an assembly of orthogonal aerials 50 and 51. Furthermore, the doubt eliminating antenna 52 and the associated phase shifting circuits 53 furnish a high frequency current over relay 54 to the input circuits of receiver 48. When the upper armature 55 of relay 54 comes on to its contact 56, the receiver operates in the doubt eliminating position, i. e. the minima of the envelope curve of the current issuing from receiver 48 are brought closer together by pairs. However, relay 54 also controls the position of armature 57 on one or other of contacts 58 and 59 and distributes the current of output tube 60 either to deflection element 61 or to deflection element 62, of the cathode ray tube that is used as indicator.

In the bearing taking position, armature 55, is not on its contact 56, and receiver 48 feeds the deflection coil 62 and gives the image of the direction 63 in the form of two leaves at 180°. When the relay makes the contact 55—56, it also makes the contact 57—58 and the receiver's output circuit 60 feeds deflection coil 61. The circuit is then in the doubt eliminating position, since the circuits 53 are connected to the receiver, and after rotation by 90°, the image is distorted in a way suitable for furnishing the image 64 on the screen of the cathode ray tube.

Relay 54 is energized through the intermittent contact 65 which is controlled, for example, by cam 66 keyed on the end of the shaft of a small synchronous motor 67. Contact 65 can consequently operate a certain number of times per second. Relay 54 therefore periodically connects and disconnects the doubt eliminating circuits 53 at the same time that it switches the deflection coils 61 and 62 of the oscillograph. If the motor rotates at a sufficiently rapid speed, or the commutation takes place at a sufficiently high speed, or the fluorescent substance is of such a kind that it insures persistence of the luminous indications, the eye will have the impression of the persistence of the two images which will appear superposed. Although a relay has been shown for effecting the alternate commutation, cam 66 may be used for directly controlling contacts 55—56 and 57—58—59. Suitable selection of the profile of the cam makes it possible to control the respective times spent for taking bearings and for actuating the doubt eliminator.

Fig. 7 illustrates another example of an embodiment of an automatic doubt eliminating radio direction finder of this kind in which the receiver 68 comprises two output stages 69 and 70 that are each connected to a deflection system 71 or 72 of the cathode ray tube that is used as indicator.

Relay 73 then operates in the manner explained in connection with relay 54 of Fig. 6, i. e. under control of cam 74 driven by motor 76; but in order to avoid cutting off relatively large currents, it alternately switches the return circuits of the grids of the receiver's output stages 69 and 70 to a strongly negative bias 88 that alternately cuts out the operation of one or other of the tubes 69 and 70.

This arrangement makes it possible to omit rupturing current filter circuits and the strays that might result from the same, and accordingly avoid distortions of the images on the fluorescent screen. In this variant embodiment, cam 74 may also be used to directly control the contacts for alternately putting output tubes 69 and 70 in operation. Besides, any other combination may be employed that uses a weak current, e. g. a grid return current of an amplifier tube for controlling the setting up or suppression of any operating method for feeding either the deflection elements 71 or the deflection elements 72.

Another variant of an embodiment is shown in Fig. 8 in which the receiver 77 that is fed by the directional aerials 86 and the finder 87 comprises two output stages 78 and 79 whose biasing potentials are furnished by a distributor 80 of any known type, consisting, for example, of a circuit that feeds stages 78 and 79 with alternating voltages in phase opposition in such a way that when tube 79 is operating, tube 78 is blocked and vice versa. In synchronism with this commutation of output stages 78 and 79, the receiver's doubt eliminating circuit (not shown) which is connected to the vertical or non-directional antenna 81 is placed in operative and non-operative condition respectively by an electronic commutator 88; for example, this doubt eliminating circuit can be rendered active each time that output stage 78 is set in operation, and blocked each time that output stage 79 operates. In this way and by purely electronic means, the commutation is effected so as to cause the simultaneous appearance of the bearing image and the doubt eliminating image on the screen of the cathode ray tube employed as indicator and having its orthogonal pairs of windings or deflection coils 82 and 83 connected to the output stages 78 and 79 respectively.

Circuit 80 that feeds with biasing potentials the various output and doubt elimination stages may be of any known type and, in particular, may be formed by using a generator of sinusoidal voltage having the two alternations rectified, one of the alternations serving to block stage 78 and the other to block stage 79, for example.

As a rule, if it is desired to avoid the use of two deflection systems that are different or placed alternately in a 90° staggered phase position, another feature of the invention provides for effecting the commutation, not in the output stages or the orthogonal deflection systems but in the coils of a radio direction finder that comprises two perpendicularly coiled rotors, or else alternately in the stators of a radio direction finder so as to produce the 90° stagger between the image of the bearing and the doubt eliminating image.

In order to differentiate the two indications of bearing and of doubt elimination, the method described when discussing the circuit of Fig. 1 may be employed in order to cause one of the images, preferably that of doubt elimination, to appear as a dotted line. This can be done irrespective of whether the commutation is mechanical, electronic or semi-electronic. It is always possible to modulate a scanning voltage with a very high frequency with respect to the frequency of the scanning voltage. In the particular case discussed in connection with Fig. 8, the commutation can also be effected in such a way that one image will appear with greater luminosity than the other; to accomplish this, it is sufficient to stagger the operating point of the detection system so that it is no longer symmetrical, as indicated in Fig. 8a by the unsymmetrical wave forms 84a and 85a produced by the distributor 80 i. e. so that one tube is blocked for a longer time than the other.

The various examples of embodiments that have just been described relate more particularly to radio direction finding systems in which the finder and the scanning elements rotate at a rate of speed of 50 revolutions per second, for example, the cadence of commutation of the bearing and doubt elimination images taking place at a lower frequency so that there will be at least one complete scanning revolution for the appearance of each image during the alternating commutation; this commutation is then assumed to be at the rate of ten to fifteen images per second.

It is however possible to effect the commutation at a much more rapid frequency. It will be all the easier to do this if use is made of purely electronic means and this commutation can then be done at a frequency of several thousand cycles per second, for example, the spot alternatively assuming the positions that it would occupy in each commutation for the time during which this commutation remains in each position. The two images are accordingly formed practically simultaneously, the spot successively describing a small portion of each of them.

It is evident that the examples of embodiments shown and described do not in any way limit the field of application of the invention which relates in a general way to means for causing the simultaneous appearance of at least two indications on the screen of a cathode ray oscillograph and for visually differentiating these two indications in systems for radio direction finding, for measurement of phases or other electric quantities, for remote repetition of angles, etc.

What is claimed is:

1. A radio direction finding system comprising a signal indicator, means for actuating the indicator to provide indications corresponding to each of two separate trains of impulses, comprising separate means for impressing each train on the indicator, and means for actuating the train-impressing means in alternation by impressing an alternating potential on each train-impressing means, said potentials being opposite in phase.

2. A system as set forth in claim 1, in which each train-impressing means includes a vacuum tube, and said alternating potential is applied to the grid of said tube to block and unblock said tube in alternation.

3. A radio direction finding system comprising a directional radio signal receiver, a separate source of oscillations, a cathode ray tube, means including a vacuum tube for impressing signal-derived impulses from the receiver on the cathode ray tube to form an image indicating the line of signal direction, means including a vacuum tube, for impressing impulses derived from said oscillations on the cathode ray tube to form a second image, and means for alternating the formation of said images, including means for impressing on each of said vacuum tubes alternating blocking and unblocking potentials, the unblocking potentials being impressed on said tubes in alternation.

4. A system as set forth in claim 3, in which said source of oscillations includes means for receiving a second radio signal.

5. A system as set forth in claim 3, in which the source of oscillations includes a non-directional receiver for said radio signal.

6. A radio direction finding system comprising a directional radio signal receiver, a separate source of oscillations, a cathode ray tube, means for impressing signal-derived impulses from the receiver on the tube to form an image indicating the line of signal direction, means for impressing impulses derived from said oscillations on the tube to form a second image, and automatic means for alternating the formation of said images, including means for circumferentially offsetting the position of the oscillation-derived image relative to the signal-derived image.

7. A system as set forth in claim 6, in which the cathode ray tube includes ray deflecting elements, and the oscillations are impressed on one of said elements while the signal-derived impulses are impressed on another of said elements effective at right angles to the former element.

8. A system as set forth in claim 6, in which the impulses derived from said oscillations produce a doubt eliminating image, and in which said latter image is circumferentially offset substantially 90° from the signal-derived image.

9. A radio direction finding system, comprising a directional radio signal receiver, a non-directional receiver for the same signal, a cathode ray tube, ray deflecting elements associated with said tube, means for impressing impulses derived from the directional receiver on certain of said ray deflecting elements to form an image indicating the line of signal direction, means for combining signal-derived impulses from the directional receiver and the non-directional receiver and impressing the combined impulses on other deflecting elements to form a lay indicating image, said other elements being operative in a direction offset substantially 90° from the direction of operation of said former elements, the arrangement being such that the lay indicating image is circumferentially offset by substantially 90° from the image indicating line of signal direction, means for alternating directional receiver impulses and the combined directional receiver and non-directional receiver impulses at such a rate that the two images appear simultaneously on the cathode ray tube, and means for operating said directional receiver at such a rate as to produce at least one complete image for each alternation.

10. A radio direction finding system comprising a directional radio signal receiver, a non-directional receiver for the same signal, a visual signal direction indicator, means for actuating the indicator by impressing a train of impulses derived from the directional receiver to form an image indicating the line of direction of the signal, means for actuating the indicator by impressing thereon a train of impulses derived from both the directional receiver and the non-directional receiver combined to form a lay indicating image circumferentially offset by substantially 90° from the former image, means for alternating directional receiver impulses and the combined directional receiver and non-directional receiver impulses at such a rate that the two images appear simultaneously on the cathode ray tube, and means for operating said directional receiver at such rate as to produce at least one complete image for each alternation.

11. A radio direction finding system comprising a signal indicator, means for actuating the indicator to provide indications corresponding to two separate trains of impulses, comprising separate means for impressing each train on the indicator, each including a vacuum tube, and means for actuating the train-impressing means in alternation, including means for closing and opening the grid circuits of said tubes.

12. A radio direction finding system comprising a directional radio signal receiver, a separate source of oscillations, an indicator adapted to display luminous direction indicating images, means for actuating the indicator by impulses from the receiver to form an image indicating the line of direction of the signal, means for actuating the indicator by impulses derived from said oscillations to form a second image, and means for imparting different relative luminosities to said images, comprising means for automatically producing said images alternately on the indicator with the periods of appearance of one image longer than those of the other image.

13. A radio direction finding system comprising a cathode ray tube, means for impressing on the tube a train of impulses and thereby forming an image by successive cyclic movements of the ray, and means for imparting a broken line appearance to the image comprising means for cyclically interrupting the action of said impulses on the tube during periods corresponding to the periods of passage of the ray across non-luminous portions of the tube.

14. A system as set forth in claim 13, in which the means for imparting a broken line appearance includes means for applying blocking and electron-passing potentials alternately to the control grid of said tube.

15. A system as set forth in claim 13, in which the means for imparting a broken line appearance comprises means for cyclically interrupting the impression of the train of impulses on the tube.

16. A radio direction finding system, comprising a cathode ray tube, a directional radio signal receiver, means for impressing a train of signal-derived impulses from the receiver on the tube to form an image indicating the line of direction of a received signal, a separate source of oscillations, means for impressing a train of impulses derived from said oscillations on the tube to form a second image, and means for forming one of the images in broken lines comprising means for cyclically interrupting the impression of one of said trains of impulses on the tube during periods corresponding to the passage of the ray across non-luminous portions of the tube.

JEAN AHIER.
RENÉ HARDY.